3,305,900
LIQUIDLESS FOUNDRY MOLDING PROCESS
Robert J. Mulligan, Cleveland Heights, and Jerome J. Wendt, West Richfield, Ohio, assignors to Archer-Daniels-Midland Company, Minneapolis, Minn., a corporation of Delaware
No Drawing. Filed Oct. 29, 1964, Ser. No. 407,559
14 Claims. (Cl. 22—192)

The present invention relates to foundry processes involving sand structures (e.g., molds and cores), as well as to the products thereof. In another aspect, the present invention relates to a process for improving the surface characteristics of sand molds and cores by surface treatment thereof with finely divided solids suspended in a gaseous medium.

Metal castings prepared by pouring molten metal into sand molds are, to a large extent, dependent for their properties and qualities on the nature and character of the mold and core surfaces against which the molten metal flows and sets. The smoothness of the sand surfaces, the ability of the sand and sand surfaces to conduct heat, and the reaction of the sand surfaces to the hot, molten metal are all factors which have an important bearing on the quality of the castings.

Foundry sand practice properly embraces the treatment of molds and cores with coatings to improve the quality of castings made with such molds and cores. Common methods of treating molds and cores include the preparation of a special facing sand, coating the sand surfaces with liquid suspensions of refractory material (e.g., as by spraying or dipping), and the like. Less commonly, damp mold and core surfaces have been dusted with dry, powdered refractory materials. This latter technique is not particularly effective, except in readily accessible areas such as the gate, since the coatings are not uniform in thickness and do not effectively cover irregular and complex shapes.

It has now been discovered, and this discovery forms a basis for the present invention, that the surface characteristics of sand structures (e.g., cores and molds) can be improved by treating the surfaces thereof with a gaseous suspension of refractory particles. In one sense, the present process could be described as a liquidless process. By way of illustration, a heated sand structure (e.g., core) can be given enhanced surface characteristics by momentarily dipping it into a fluidized bed of finely divided refractory particles, which particles have preferably been previously coated with a thermoplastic resin. On removal from the fluidized bed, the structure cools quickly and a thin, uniform surface coating is formed. Castings made with sand structures treated in accordance with the present invention have been repeatedly demonstrated to be of excellent quality.

The present process can be used to apply a refractory material to sand structures having surfaces formed from special facing sands and the like, thus combining the advantages of several methods. Coatings produced by the present process are complete and highly uniform, even on irregular and complex shapes. The need for water or flammable solvents (required by many conventional processes) is completely eliminated. No set-up time or pre-mixing of materials in solvents is needed. The present process does not depend upon surface wetting and drying. By utilizing the present process, considerable cost reduction and valuable process innovations can be realized. Of particular importance is the simplicity involved and the time that is saved.

An important aspect of the present invention has been the discovery that if a thermoplastic resin is used in conjunction with the gaseous suspension of refractory material, it is possible to provide a considerably improved coating. Such improved coatings are strongly adherent t the sand surfaces and can be removed only with consi( erable difficulty. Preferred coatings prepared by the pre ent process are bonded so strongly to the sand surfac( that their complete removal actually requires destructio of the underlying sand surface.

The thermoplastic resins can be used in a variety ( ways. First, the resins, in finely divided form, can t suspended in a gaseous medium (e.g., a fluidized bed) an be thus applied to the sand structure (e.g., as by dipping heated sand structure into a fluidized bed of resin). Se ond, finely divided resins can be co-mingled with the r fractory material in a gaseous suspension, and the tw materials can then be applied to the sand structure simu taneously. More preferably, the thermoplastic resin cz be used to first coat the finely divided refractory materis This coated refractory material is then suspended in gaseous medium (e.g., a fluidized bed) and subsequent contacted with the sand structure to be coated. If desire various combinations of these techniques can be employe It is intended that the resin should melt sufficiently (i.( at least soften enough to become tacky) to adhere to tl surface of the sand structure and to thus provide a rece tive site for the finely divided refractory particles. C cooling, the resin will solidify and firmly bond the refra tory material to the sand structure. Although the res can be melted just prior to coating the sand surfaces, e., as by passing a fine spray of thermoplastic resin toward t sand structure and through a flame front, the preferr( technique is to select a resin having a melting point belc the temperature of the hot sand surface to be coate Then, the heated sand structure can be contacted with gaseous suspension of resin, e.g., as by dipping the sai structure into a fluidized bed of resin or resin-coated 1 fractory, and the resin will then melt or soften. In a li manner, once a resin is selected, the sand structure can pre-heated to a temperature above the melting point of t resin. It is preferred to melt the resin by applying it tc sand surface heated to a temperature above the melti) point of the resin. This latter technique is especially d sirable since it is the simplest technique, and heating t sand also provides additional advantages as are herei after described. On cooling, the resin provides a tenacio matrix that firmly bonds the refractory material to t sand.

Means and methods for suspending finely divided soli in a gaseous medium (e.g., air) are well known. Su methods include feeding the particles to a spray nozz or spray zone where they are picked up and propell by a stream of gas under pressure. In this manner, surface to be coated is bombarded with particles trav( ing uni-directionally. In practicing the present inve tion, it is preferred that the gaseous suspension be in t form of a fluidized bed. For simplicity, it is preferr( to use air as the fluidizing medium, although other gas( e.g., inert gases, can be used. The advantages are th a fluidized bed behaves much like a liquid, and cons quently all surfaces of a core or mold which has be dipped into a fluidized bed are rapidly covered with uniform layer of the fluidized solid particles. Tl seems to be due to the fact that in a fluidized bed, t particles have a more random motion. Unlike liqu suspensions, however, no solvent is required and dryi is unnecessary. Equipment is commercially available f forming both sprays and fluidized beds, and such co1 mercially available equipment can be used effectively practicing the present invention.

The sand structures (e.g., molds and cores) that c be benefitted by application of the present process e compass all those sand structures routinely employed the foundry art. A wide variety of sand molds a cores have been tested (i.e., those prepared accordi currently accepted foundry practice from typical sands, [ins], core oils, and the like) and all such molds and [cor]es were successfully coated by the present process. [As] previously indicated, the present invention offers sig[nif]icant advantages over current techniques employing [liq]uids, especially when complex shaped molds and cores [are] used.

Pre-heating the sand structures to temperatures above [10]0° F., e.g., even as high as 500° F. and higher, fa[cil]itates the coating process of the present invention. [It] has been found that heating the sand structures to [tem]peratures of at least 200° F., preferably to at least [25]0° F., and still more preferably to at least 300° F., [im]mediately before contacting them with a gaseous sus[pen]sion of thermoplastic resin, results in a more rapid [for]mation of the desired coating and a better adhesion [of] the refractory particles to the sand surfaces. A sand [str]ucture temperature of from 300°–400° F., e.g., about [35]0° F., has been found to be especially desirable. As [pre]viously indicated, higher temperatures may be used, [bu]t the results to be obtained do not ordinarily warrant [the] additional heating expense.

An added advantage in heating the sand structures is [tha]t the normally non-conductive sand appears to be[co]me more receptive to electrical charges. Consequent[ly,] electrostatic techniques can be employed. According [to] this method, finely divided refractory particles and/or [res]ins are suspended in a gaseous medium, preferably [air], and are given an electrical charge of one polarity [(e.g.,] negative or positive). The particles may be given [the] charge before or after they have been suspended in [the] gas. The sand structure is then heated and sub[seq]uently given an electrical charge of oppositely polarity. [Th]e heated sand structure is then contacted with the [ga]seous suspension of finely divided, charged, refractory [ma]terial and/or resin. Preferably, the refractory ma[ter]ial and/or resin is given a negative charge and the [sa]nd structure is given a positive charge. The oppositely charged materials attract each other and a uniform [lay]er of refractory material is deposited on the sur[fac]e of the sand mold or core. No drying is required [an]d no solvents are used.

The resins that are useful in the present process are [the] normally solid thermoplastic resins, preferably those [ha]ving melting points above 100° F., e.g., up to 350° [F.] and higher. Preferably these resins will have a melt[ing] point of from 125° F. to 300° F., e.g., 150°–250° F. [W]hen the sand structures to be coated are pre-heated [to] from 250° F., to 450° F., e.g., to 350° F., resins [me]lting or becoming tacky at from 175° F. to 250° F., [e.g.], about 225° F., are especially well suited. It is to [be] understood that resins do not usually melt at any [on]e temperature, but rather do so over a range of tem[pe]ratures. The important aspect is that they become [tac]ky or sticky at these temperatures and thus can act as [ad]hesives or binders for the refractory material. The [he]at available in the hot sand structure is sufficient to [me]lt or sufficiently soften the resin on contact, form [a] receptive site for the refractory material, and cause [the] refractory material to be firmly bonded to the sand [su]rfaces on cooling. Typical resins include the epoxy [res]ins e.g., the Epons sold by the Shell Chemical Co.) [wh]ich frequently melt at from 150° F. to 250° F.; wood [res]ins melting at, for example, 150° to 250° F., pitch [me]lting at, for example, 200° F. to 300° F., and the [lik]e. Mixtures of resins can be used. Epoxy resins are [pr]eferred.

The refractory materials that are useful in the present [pr]ocess include the zircon, silica, talc, graphite, mica, [cla]y and other refractory materials as known in the [fou]ndry art. Zircon, silica, and graphite refractories [are] especially well suited, with graphite and silica being [the] most preferred. If desired, mixtures of the re[fra]ctory materials can be used. Particle size is important. [Th]e refractory materials should be finely divided. Sieve sizes (Tyler Standard Screen Scale Sieves) below 80 mesh are desirable. Generally, particle size will be below 100 mesh and preferably below 150 mesh. A particle size of about 200 mesh has proven quite satisfactory for most applications, although occasionally it may be desirable to use an even finer material, e.g., 325 mesh or even particles of sub-sieve size.

As previously indicated, it is preferred to first coat the finely divided particles of refractory material with the thermoplastic resin. This may be done by any of the coating techniques known in the art. Then, the coated refractory particles are contacted with the hot sand surface to form a first coating thereon. This may be the only coating applied. More frequently, however, the hot sand structure is subsequently or simultaneously contacted with additional, uncoated refractory to form the desired surface. Pre-coating the refractory material offers a number of significant advantages, including a reduction in the total amount of resin required and a corresponding increase in the total amount of refractory material present in a given volume of coating. Keeping the resin content low reduces the likelihood of excess gas being formed during casting, which gas otherwise contributes to blows and casting porosity. When it is desired to pre-coat the refractory material, the amount of resin employed will usually be sufficient to substantially coat (e.g., completely coat) the finely divided particles of refractory material, although this is not essential. All that is required is that sufficient resin be present to later bond the refractory particles to the sand structure. Generally, the amount of resin employed will be a bonding amount of from 2 to 100 weight percent or more, e.g., 200 weight percent, based on the weight of the refractory material to be coated. More frequently, from 10 to 75 weight percent, e.g., about 50 weight percent, resin will be used (on the same basis).

Where the refractories are not pre-coated, but the resins and refractories are co-mingled in a single gaseous suspension, these same relative amounts will usually apply, e.g., 10 to 75 weight percent resin, based on the total weight of refractory material present. However, where the refractory material is not pre-coated with thermoplastic resin, it will ordinarily be desirable to employ at least two gaseous suspensions (e.g., two separate fluidized beds). The first of these will contain finely divided resin and the subsequent ones will contain finely divided refractory particles. As previously indicated, these suspensions are preferably in the form of fluidized beds. In such a situation, the resin particle size will be in general conformity to the particle sizes previously given with reference to the refractory material, e.g., about 200 mesh is a particularly effective resin particle size for most applications.

It has been found that a thin coating will form on a heated sand structure when the latter has been dipped into a fluidized bed, containing resin, for a short, predetermined period of time, e.g., one to sixty seconds or more. Effective results are generally obtained when the time of contact is from two to fifteen seconds, e.g., five to ten seconds. Comparably periods of time are also applicable to the subsequent contact with the refractory particles, e.g., two to fifteen seconds is usually sufficient. When a single gaseous suspension (e.g., one fluidized bed) is used, the same periods of time are again applicable. However, all other conditions being equal, a single bed will usually require a longer period of time, to form the same ultimate film, than one-half of the time involved in a two bed process. In any event, the time of contact will always be sufficient to form a complete film, generally from 1 to 20 mils thick, e.g., 2 to 10 mils thick (based on the combined thickness of resin and refractory).

The present invention is further illustrated by the following specific examples which include a preferred embodiment. Unless otherwise indicated, all parts are by weight and all percentages are weight percentages. The fluidized beds referred to in the following examples were formed using air as the gas and a Model C, Vibro-Fluidizer, manufactured by the Armstrong Products Company, Inc., Warsaw, Indiana. The manufacturer's list of instructions, provided with this equipment, was followed very closely in running the tests.

Examples 1–3, inclusive, illustrate the use of a plurality of gaseous suspensions.

*Example 1*

Sixteen crankcase cores, weighing approximately 7 lbs. each, are prepared from 60 AFS Lake Sand and bonded with 1% cereal (corn cereal from Cross Milling Company, of Milwaukee, Wisconsin) and 1% core oil. These sixteen cores, all prepared according to currently accepted foundry practice, are pre-heated to 350° F. for thirty minutes. The pre-heated cores are then dipped into a first fluidized bed for five seconds, thereby coating said cores with a thin film of tacky resin. The first fluidized bed contains finely divided (200 mesh) thermoplastic epoxy resin (resin sold by Armstrong Products Co. on the basic of its melting point), having a melting point of about 225° F. At the end of the five seconds period, the sand cores are removed and immediately dipped into a second fluidized bed for five seconds. The second fluidized bed contains 200 mesh flake graphite. After removal from the second fluidized bed, thirty seconds are allowed to elapse for cooling purposes. At the end of this thirty second waiting period, air is blown over the cores to remove excess graphite. Film thickness (resin plus graphite) is observed to be about 4 mils. After allowing the cores to cool, they are placed in molds and cast in gray iron. The casting finish is comparable to that obtained with cores coated by conventional, time consuming, liquid coating systems.

*Example 2*

The procedure of Example 1 is repeated using 200 mesh wood rosin in place of the epoxy resin. The rosin is Vinsol, a thermoplastic resin of Hercules Powder Co. having a melting point of about 220° F. to 240° F. Excellent results are again obtained.

*Example 3*

The procedure of Example 1 is repeated using 200 mesh pitch having a melting point of between 200° F. and 250° F. in place of the epoxy resin. Again, excellent results are obtained.

Examples 4–6, inclusive, illustrate the use of a plurality of gaseous suspensions, a pre-coated refractory material, and a mixture of refractories.

*Example 4*

The same type and number of cores is used as in Example 1. Two fluidized beds are used. The first fluidized bed contains finely divided silica refractory flour which has been precoated with epoxy resin (same resin as in Example 1). This precoating is accomplished by mixing equal amounts (by weight) of 200 mesh resin and 200 mesh silica, and heating the mixture while subjecting it to high speed mixing (a high shear rate). The temperature is raised sufficiently to cause the resin to become tacky without completely melting it. Because the resin is not completely melted and because the shear rate is high, agglomeration is not a problem and finely divided solids are recovered. The purpose of pre-coating the silica is to achieve additional refractoriness and reduce the amount of resin on the core surface. The second fluidized bed contains 200 mesh flake graphite. The cores are again pre-heated to 350° F. for thirty minutes. They are then dipped into the first fluidized bed for five seconds, withdrawn, and immediately dipped into the second fluidized bed for five seconds. After removal from the second fluidized bed, a thirty second cooling period is allowed and air is again used to blow off excess graphite. Film thickness (resin plus refractory material) is approximate 5 mils. Casting results are again excellent.

*Example 5*

The procedure of Example 4 is repeated using the pitc of Example 3 in place of the epoxy resin. Casting r sults are again excellent.

*Example 6*

The procedure of Example 4 is again repeated using tl wood rosin of Example 2 in place of the epoxy resi. Casting results are again excellent.

Examples 7–9, inclusive, demonstrate the use of a on bed system and pre-coating of the refractory material.

*Example 7*

The same type and number of cores is used as in E ample 1. In this example, only one fluidized bed is use It contains a finely divided, pre-coated material pr pared from a mixture of 35 weight percent of 200 mes refractory silica, 35 weight percent of 200 mesh flal graphite, and 30 weight percent of 200 mesh epoxy res (the resin of Example 1). This combination is pr coated by the hot coating technique described in E ample 4. The cores are again pre-heated to 350° F. f thirty minutes. The hot cores are then dipped into tl fluidized bed for ten seconds, removed, and the exce pre-coated refractory powder is blown off after waitir thirty seconds. Film thickness (resin plus refractory) about 5 mils. Casting results are again excellent.

*Example 8*

The procedure of Example 7 is repeated using the wo rosin of Example 2 in place of epoxy resin. Casting r sults are again excellent.

*Example 9*

The procedure of Example 7 is repeated using the pit of Example 3 in place of epoxy resin. Casting resul are again excellent.

The following example illustrates the use of an electr static technique.

*Example 10*

The same number and type of sand cores is used as Example 1. These sand cores are pre-heated to 350° for thirty minutes in an oven. A dry mixture is prepar by simple blending of 50 parts silica flour (200 mesh 25 parts zircon flour (200 mesh), and 25 parts of t wood rosin (200 mesh) of Example 2. This mixture placed in a fluidizing tank using air as the fluidizii means. As the dry mixture is introduced into the flui izing tank, it is slowly passed across a negatively charg metal plate. The heated sand cores are removed fro the oven and quickly brought into contact with a met plate carrying a positive charge. Then, the sand cor are immediately dipped into the fluidized bed for t seconds. The cores are then removed from the fluidiz bed, a cooling period of thirty seconds is allowed, a excess refractory material is removed with air. Aft cooling, a thin coating of refractory material and res is found to adhere to the core so tenaciously that it ca not be rubbed off without removing grains of sand fro the original core. Casting results are excellent again.

In all of the examples just described, the refracto coatings are of uniform thickness, adequately coveri all sand surfaces. Metal castings made with the aid cores prepared by the present process are, in all cas equal in properties and qualities to castings prepar from sand cores that have been coated by currently a cepted foundry techniques using liquid suspensions of t refractory materials. In many cases, an improvement the smoothness of the surfaces of the castings is note visually, when the cores prepared by the present proce are used. Thus, it will be recognized that the prese invention offers a process, new to the foundry art, that fast, effective and economical.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples, nor by any of the specific proportions which have been given for the sake of illustration, but it is intended to claim all novelty inherent in the invention, as well as all modifications and variations coming within the spirit and scope of the invention.

What is claimed is:

1. A liquidless foundry process for improving the surface characteristics of sand molds or cores, which comprises:
    (a) heating a sand mold or core to 350° F.;
    (b) dipping the heated sand mold or core into a first fluidized bed for five seconds, said first fluidized bed containing 200 mesh thermoplastic epoxy resin having a melting point of about 225° F.;
    (c) removing said sand mold or core from said first fluidized bed and quickly dipping it into a second fluidized bed for five seconds, said second fluidized bed containing 200 mesh flake graphite; and
    (d) then cooling said sand mold or core.

2. A liquidless foundry process for improving the surface characteristics of foundry sand structures, which comprises:
    (a) heating a foundry sand mold or core;
    (b) contacting said heated mold or core with a fluidized suspension of finely divided refractory material and thermoplastic resin, said resin being melted sufficiently on contact to firmly bond and refractory material to a surface of said sand mold or core on cooling, said refractory material having a particle size below 150 mesh; and
    (c) thereafter cooling said mold or core.

3. The process of claim 2 wherein the mold or core is heated to at least 200° F. and wherein the particle size of said refractory material is below about 200 mesh and wherein said resin has a melting point of from 100° F. to 300° F.

4. The process of claim 2 where said resin is used to pre-coat said refractory material prior to said contacting.

5. A liquidless foundry process for improving the surface characteristics of sand molds or cores, which comprises:
    (a) heating a sand mold or core to a temperature of from 250° F. to 450° F.;
    (b) contacting said heated mold or core with a fluidized suspension of thermoplastic resin and a fluidized suspension of refractory material, said resin having a melting point of from 150° F. to 250° F. and a particle size of below 150 mesh, said refractory material having a particle size of below 150 mesh, said resin being melted sufficiently on contact to firmly bond said refractory material to a surface of said mold and core on cooling; and
    (c) continuing said contacting for a period of time sufficient to form a uniform, thin film of resin and refractory material over the surface of said mold and core.

6. The process of claim 5 wherein refractory material is pre-coated with resin prior to said contacting.

7. The process of claim 5 wherein only one fluidized bed is used and the time of contact is from one to sixty seconds.

8. The process of claim 5 wherein two fluidized beds are used, resin being in the first fluidized bed and refractory material being in the second fluidized bed, and wherein the time of contact with each fluidized bed is from two to fifteen seconds.

9. The process of claim 8 wherein said first bed contains only resin and second bed contains only refractory material.

10. A foundry process for improving the surface characteristics of sand structures, which comprises:
    (a) heating a foundry sand structure and giving it a first polarity;
    (b) forming a gaseous suspension of finely divided solid refractory material having a second polarity; and
    (c) contacting said heated sand structure with said gaseous suspension for a time sufficient to form a coating on said sand structure with said refractory material, said sand structure having a polarity opposite that of said refractory material.

11. The process of claim 10 wherein said gaseous suspension is a spray.

12. The process of claim 10 wherein said gaseous suspension also contains thermoplastic resin.

13. The process of claim 10 wherein said gaseous suspension is a fluidized bed.

14. A liquidless foundry process for improving the surface characteristics of foundry sand structures which comprises contacting the surface of a mold or core with a gaseous suspension of finely divided refractory material wherein said gaseous suspension is a fluidized bed to thereby form a thin surface coating of refractory material on said mold or core wherein said surface is also contacted with thermoplastic resin, said resin being melted sufficiently to firmly bond said refractory material to the surface of said sand structure on cooling and wherein said refractory material has a particle size below 100 mesh.

References Cited by the Examiner

UNITED STATES PATENTS

| | | | |
|---|---|---|---|
| 308,821 | 12/1884 | Baker | 117—5.2 |
| 2,834,741 | 5/1958 | Bleuenstein | 117—5.2 X |
| 2,844,489 | 7/1958 | Gemmer | 117—20 |
| 3,002,231 | 10/1961 | Walker et al. | 18—59 |
| 3,032,816 | 5/1962 | Zimmerli | 118—423 X |
| 3,150,424 | 9/1964 | LeBlanc | 22—192 X |
| 3,196,033 | 7/1965 | Brooks | 118—421 X |

FOREIGN PATENTS

| | | |
|---|---|---|
| 1,359,843 | 3/1964 | France. |

OTHER REFERENCES

Chemical Engineering Progress, vol. 56, No. 7, July 1960, pp. 75–78, "Fluidized Bed Coating."

J. SPENCER OVERHOLSER, *Primary Examiner.*

E. MAR, *Assistant Examiner.*